Nov. 11, 1924.  1,514,911
C. A. KELLOGG ET AL
APPARATUS FOR OBTAINING IMPROVED COMBUSTION IN FURNACES
Filed Nov.10, 1921  5 Sheets-Sheet 1
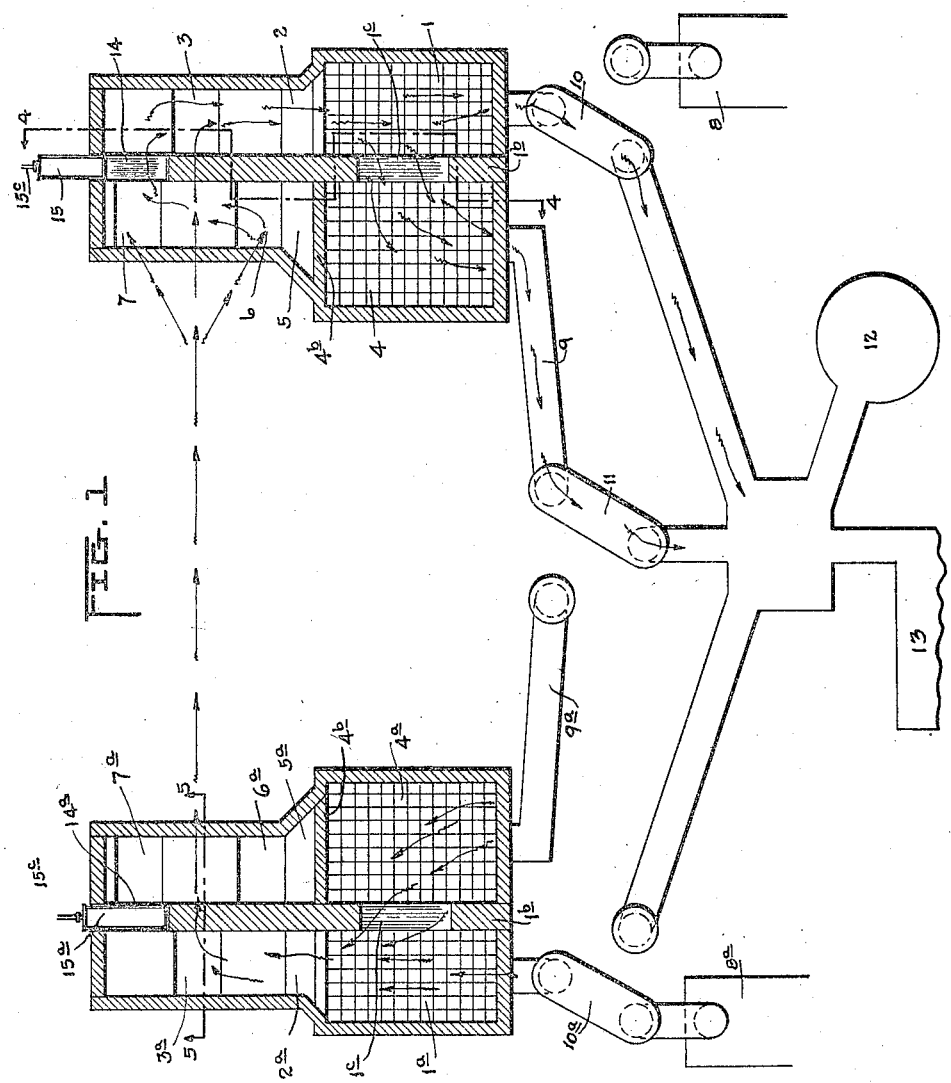
INVENTORS

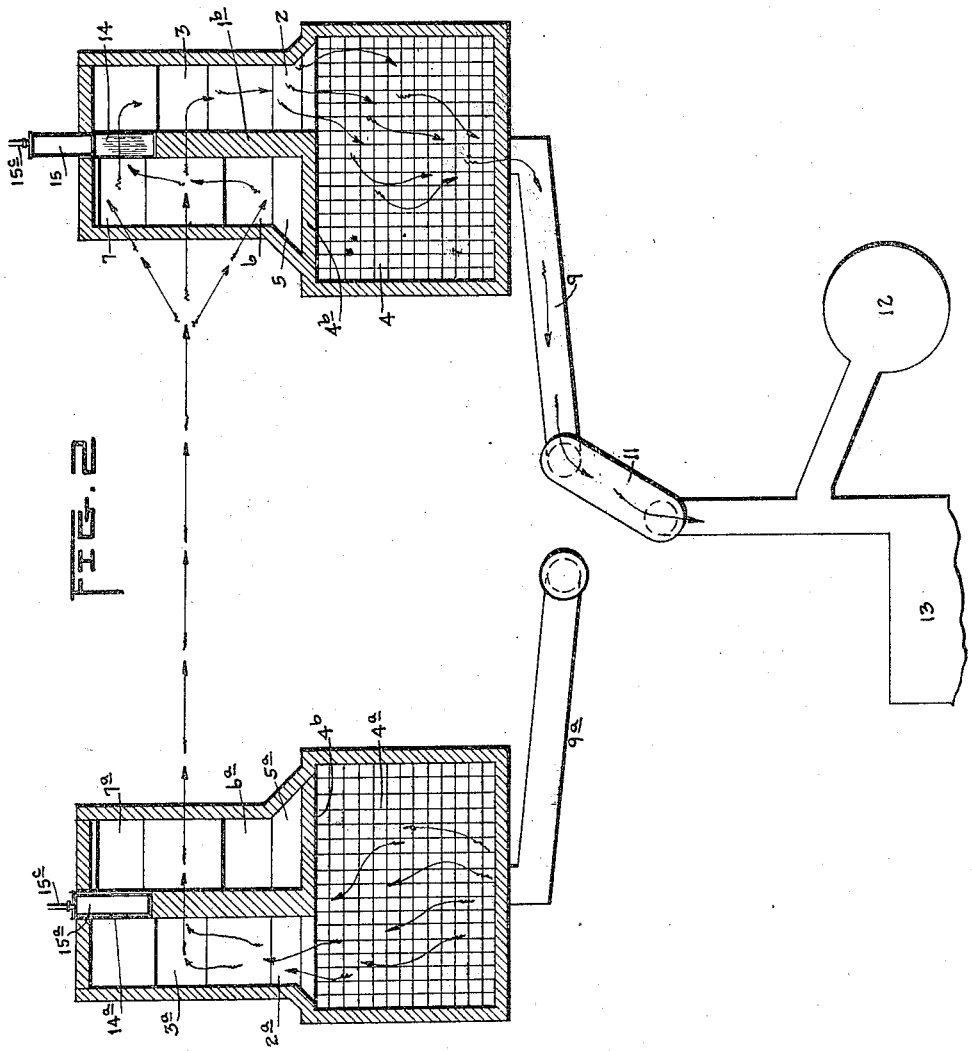

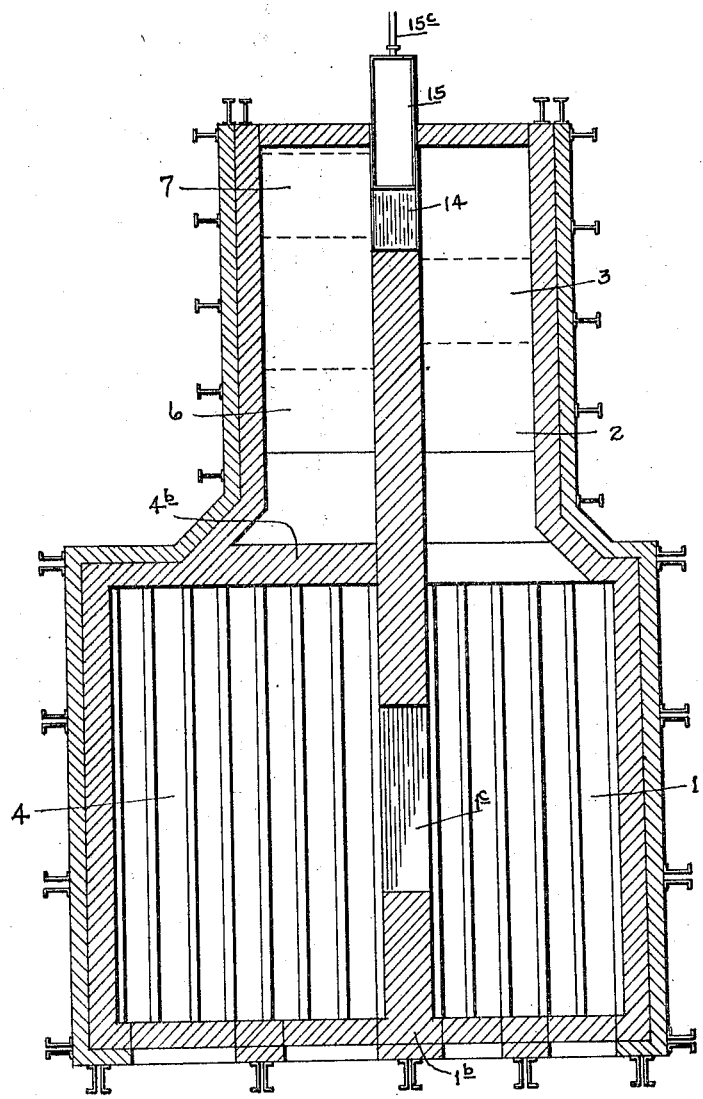

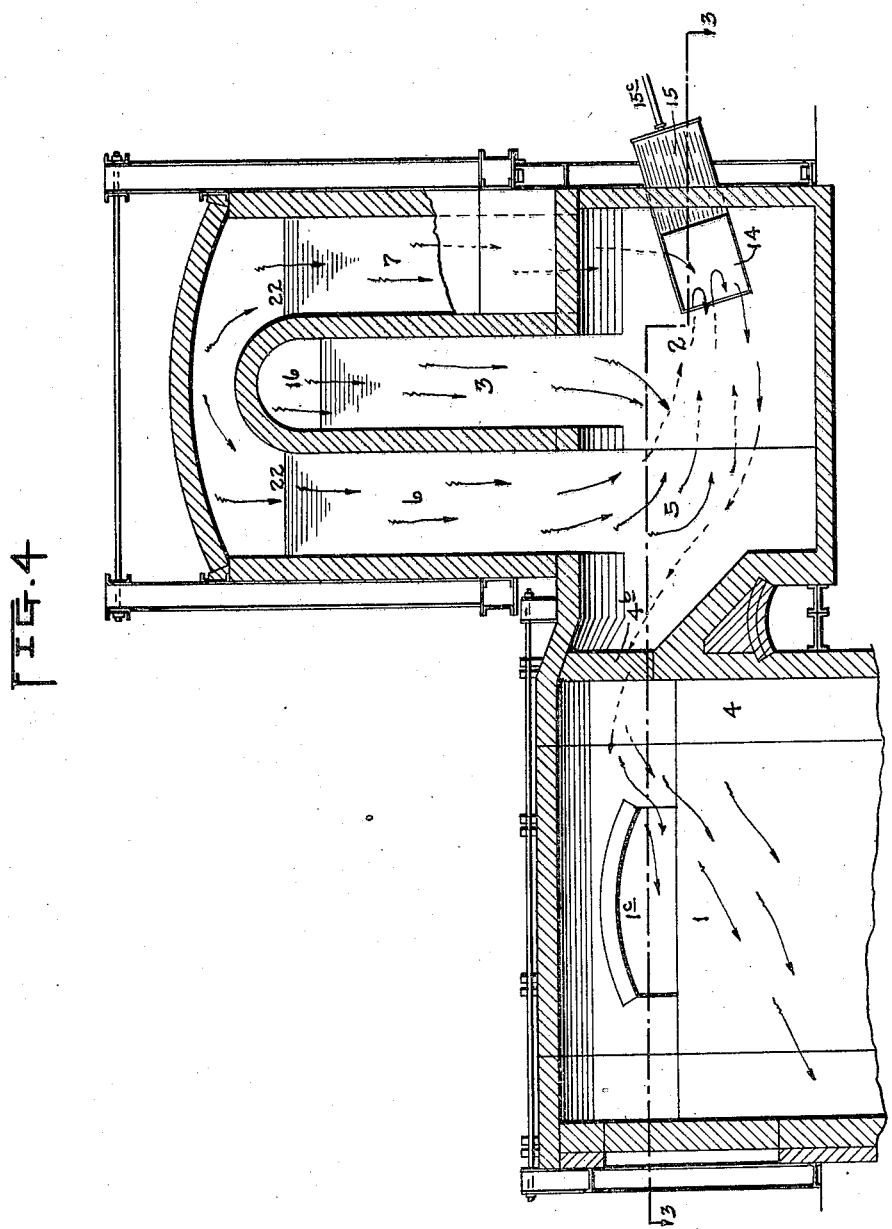

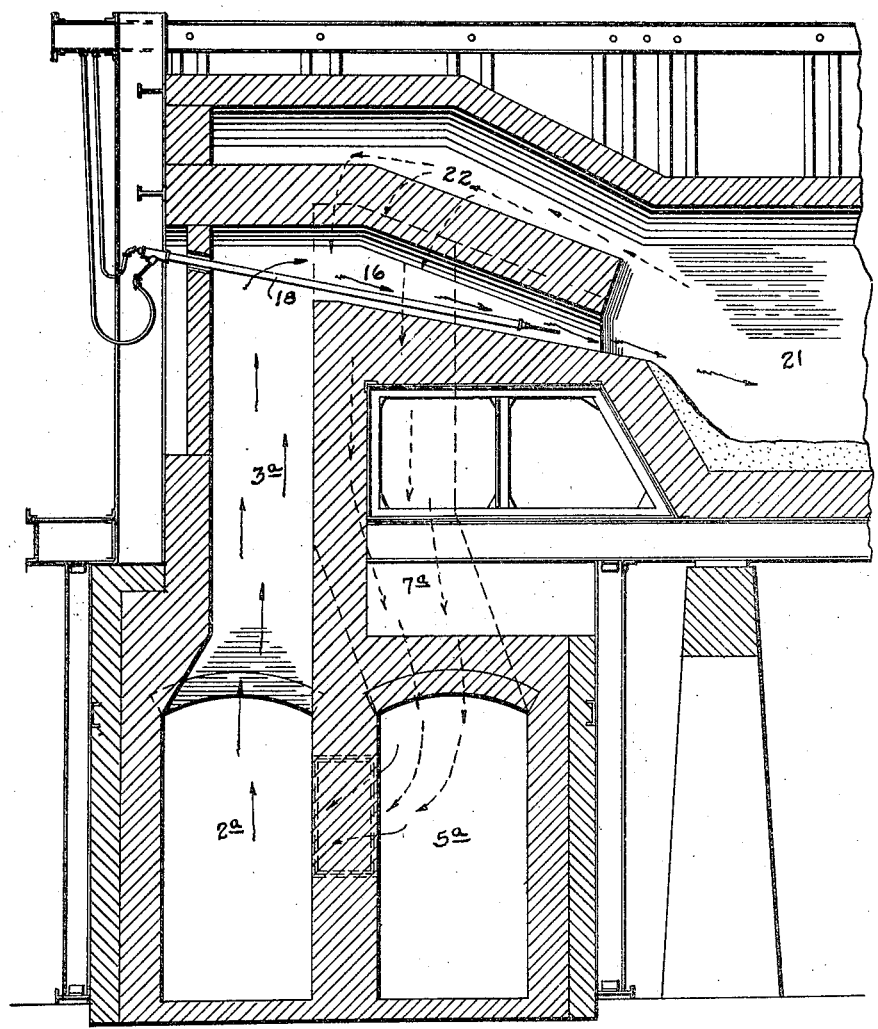

Patented Nov. 11, 1924.

1,514,911

UNITED STATES PATENT OFFICE.

CHESTER A. KELLOGG AND JULIAN L. SCHUELER, OF BARTONVILLE, ILLINOIS, ASSIGNORS TO KEYSTONE STEEL & WIRE COMPANY, OF BARTONVILLE, ILLINOIS, A CORPORATION OF ILLINOIS.

APPARATUS FOR OBTAINING IMPROVED COMBUSTION IN FURNACES.

Application filed November 10, 1921. Serial No. 514,419.

*To all whom it may concern:*

Be it known that we, CHESTER A. KELLOGG and JULIAN L. SCHUELER, both citizens of the United States, residing at Bartonville, in the county of Peoria and State of Illinois, have invented new and useful Improved Apparatus for Obtaining Improved Combustion in Furnaces, of which the following is a specification.

This invention has reference to an apparatus for obtaining improved combustion in furnaces of the reverberatory type, and particularly to open-hearth steel making furnaces.

The invention has for one of its objects to provide a more effective means for flame control for the purpose of decreasing the melting time of the charge, and also for increasing the life of the furnace.

The invention has for a further object to produce a more economical combustion of fuels by controlling the air necessary for the proper burning of the fuel.

To the accomplishment of the foregoing, we provide the furnace with a combined fuel and air inlet port of relatively small area, as compared to the laboratory of the furnace, the same being in communication with a single air up-take receiving its supply from, preferably a single regenerator, no fuel regenerator being necessary, except in the case of the use of producer gas; also in the provision of a supplementary exit port for the products of combustion. Said exit port has a relatively large area as compared to the intake port, and is arranged in communication with the air regenerator so that the products of combustion will pass therethru. The arrangement of the exit ports, in connection with the air regenerators, is such that air entering a regenerator on its way to the furnace cannot enter the furnace except thru the single air-uptake.

The invention is applicable to open-hearth furnaces now in use, of the type having separate gas and air checker chambers, and a single gas up-take with air-uptakes on either side thereof. Such a furnace is converted by forming a communication between said checker chambers, whereby all air entering the checker chambers is diverted to the one gas-uptake from whence it passes thru the combined fuel and air inlet port into the furnace, and, by forming a communication between the gas and air slag pockets, and controlling such communication by a damper, which when opened, permits communication between the supplementary exit ports and the regenerator for the escape of the products of combustion.

When constructing a new furnace, only one regenerator is necessary and the gas reversing system is omitted, except when producer gas is used as the fuel. The invention herein described contemplates the use of concentrated fuel such as oil, tar or powdered coal. In the case of liquid fuel a burner is provided located within the inlet port.

The invention herein is closely allied to that disclosed in an application filed by us on October 8, 1921, bearing Serial Number 506,298 entitled a Method and apparatus for obtaining improved combustion in furnaces. In the application just referred to an external passageway is provided which connects the gas and air slag pockets and such passage-way is controlled by a damper. In the present application, we do not use an external passage-way, but provide communication between the air and gas slag pockets by an opening thru the wall separating such air and gas slag pockets, and controlling such opening by a damper slidable in the wall and longitudinally thereof and operated from the rear. Otherwise there is very little, if any, difference between the apparatus disclosed in our pending application and this present application.

That the invention may be more fully understood reference is had to the accompanying drawings, forming part of the description, illustrating a preferred embodiment of the invention, in which:—

Figure 1 is a diagrammatic view showing the opposite ends of a regenerative furnace which has been converted from a producer gas burning furnace to an oil fired furnace, and equipped with our invention;

Figure 2 is a diagrammatic view, somewhat similar to Figure 1, but primarily constructed to embody our invention;

Figure 3 is a cross-section in plan of the gas and air slag pockets, and is as the same would appear if taken on the line 3—3 Figure 4 in the direction of the arrows;

Figure 4 is a vertical cross-section of the furnace looking toward one end, and is approximately as the same would appear if taken on the line 4—4 Figure 1 in the direction of the arrows; and Figure 5 is a vertical longitudinal sectional view thru the left hand end of the furnace, and is approximately as the same would appear if taken on the line 5—5 Figure 1, to show the arrangement of the usual gas and air slag pockets, the up-takes and the inlet port connecting the up-takes with the furnace, converted to the use of our invention.

Like characters of reference denote corresponding parts thruout the figures.

Before entering into a detailed description of the furnace for the practice of our invention, we wish to emphasize first of all, that, while the invention is applicable to furnaces using producer gas as the fuel, the invention is designed primarily for the burning of concentrated fuels, preferably liquid fuels, and the description which follows is intended to illustrate first, the conversion of a furnace constructed to be fired with producer gas, to a furnace fired with liquid fuel, and lastly, what elements of construction used on a producer gas furnace would be omitted in the building of a new furnace to practice our invention.

In the drawings, omitting reference for the present to Figure 2, the furnace shown includes the opposite end gas checker chambers 1 and 1ª communicating with the gas slag pockets, 2 and 2ª respectively, which, in turn, communicate with the gas up-takes 3 and 3ª respectively; the air checker chambers 4 and 4ª which ordinarily communicate with the air slag pockets 5 and 5ª respectively, which, in turn, communicate with the air up-takes 6 and 7 and 6ª and 7ª. In the conversion of the furnace shown in Figure 1, for the purpose of practicing our invention, the walls 1ᵇ which separates the gas checker chambers from the air checker chambers are provided with an opening 1ᶜ, whereby communication is made between the gas and air checker chambers, and in effect, produces one air regenerative chamber at each end of the furnace. Also, instead of communication being provided between the air checker chambers and air slag pockets, we block such communication by walls 4ᵇ which will divert the air entering the air checker chambers to and thru the openings 1ᶜ in the walls 1ᵇ and to and thru the gas checker chambers to the gas slag pockets and up and thru the gas up-takes. The furnace shown in Figure 1 further includes, the gas systems 8 and 8ª which are connected with the gas checker chambers 1 and 1ª respectively, and the air systems 9 and 9ª which are connected with the air checker chambers 4 and 4ª respectively.

Inasmuch as Figure 1 illustrates the usual and ordinary open-hearth furnace for the making of steel, and the invention herein contemplates the conversion of such a furnace to an oil fired furnace and for a more effective flame control and more economic combustion of fuels, it will be understood that the gas systems are not used for the introduction of fuel into the furnace, but are used as a part of the air systems for the ingress of the air at the incoming end and the egress of the products of combustion at the outgoing end of the furnace, each time the furnace is reversed. Such gas and air systems include the well known reversing valves 10, 10ª and 11 which are employed to permit the alternate reversal of direction of the ingoing air and the outgoing products of combustion, or waste gases which leave the furnace thru the checker chambers 1 and 4, or 1ª and 4ª and pass out thru the stack 12 or the waste-heat boiler 13 in a manner similar to that known in the art.

In our pending application Serial Number 506,298 we have shown and claimed flues built exteriorly of the furnace and connected so as to provide communication between the gas and air slag pockets, which is accomplished by removing the bulk-heads in each of said pockets, and controlling communication between the gas and air slag pockets by a damper arranged in said exterior flues. The present invention contemplates forming communication between the gas and air slag pockets by providing openings 14 and 14ª in the walls 1ᵇ which separate said gas and air slag pockets, and said openings are controlled by dampers 15 and 15ª, which may be of any suitable construction and of any suitable material, and connected with each of said dampers is a raising and lowering means 15ᶜ which may be connected with any suitable raising and lowering mechanism, such as a sheave-connected motor, or the same may be actuated by means of a pulley arrangement connected with the regular reversing mechanism of the furnace, either or both of which are well understood by those skilled in the art. In the arrangement of the dampers shown they slide thru the bulk-heads and in the walls 1ᵇ longitudinally thereof, as shown in the drawings.

In Figure 5 the combined fuel and air port, previously referred to, is designated 16 such port communicating as shown with the gas up-take 3ª and with the laboratory 21 of the furnace, the latter being also shown in communication with the air up-takes 7ª, thru the air port 22 in a manner usual in furnaces of this character. In this view there is also shown a means such as may be employed for introducing concentrated fuel, such as liquid fuel, thru the port 16 into the laboratory 21, said means including preferably, an oil burner 18 provided with a suitable discharge nozzle and also suitably connected with a source of supply.

By the arrangement shown, all air for combustion purposes which enters the furnace, passes up and thru what were formerly the gas up-takes, and thru the inlet ports in which are located the burners for the introduction of the concentrated fuel into the furnace. The area of the combined fuel and air inlet port is relatively less, as should be apparent, than the area of the passage-ways for the outgoing products of combustion, or waste gases. Such passageways include not only the gas up-takes, here employed as the air in-takes, but also the air up-takes here employed only as the exhaust downtakes and which are controlled by the dampers 15 and 15ª slidably arranged in the walls 1ᵇ to open and close the openings 14 and 14ª providing a means of communication between the gas and air slag pockets. And while this arrangement somewhat restricts the volume of air entering the furnace, it is sufficient for proper combustion, and altho the volume of the products of combustion are greater than the original gases, for reasons which are well known, the combined gas up-take and air up-takes provide the increased outlet for the proper and efficient escape of the products of combustion of waste gases. It should also be apparent that the restricted fuel and air inlet provides a better flame control, and the increased velocity due to the small area of such an inlet insures a hotter and faster working flame in the furnace.

The advantages gained by restricting the area of the inlet port thru which the air is introduced into the furnace insures its introduction at a higher velocity, and thru the arrangement of the burner located within the inlet port the air is brought into a more intimate contact with the fuel, requiring a smaller excess of air than is customary in ordinary practice. Due to this high velocity a sharper, smaller flame is made possible, and due to the character of the burner and inlet port, the direction of the flame is more easily controlled, thereby avoiding the usual damage to the front and back walls and the roof of the furnace, and by reason of the intimate mixture of the combustion-air and fuel, a more complete combustion takes place, thus avoiding cutting flames in the outgoing passages.

In the foregoing description, particularly of a furnace built for the use of producer gas, we have aimed to show how it is possible to convert the same to a furnace embodying our invention. In this connection, however, it is to be understood that while we have employed the usual and ordinary terms to designate the gas checker chambers, the gas slag pockets and the gas up-takes, our invention contemplates the use of a more concentrated fuel and particularly liquid fuel; therefore, the gas checker chamber, the gas slag pocket and the gas up-take are used at the fuel in-take end of the furnace for the introduction of air, and such checker chambers, slag pockets and up-takes are used conjointly with the air checker chambers, air slag pockets and air up-takes, as the means of egress for the products of combustion, or waste gases, leaving the discharge end of the furnace. The discharge of the products of combustion thru the waste gas down-takes in controlled by the dampers 15 and 15ª. It is expressly understood that air is prevented from passing up thru the air up-takes by the walls 4ª and 4ᵇ, and the dampers 15 and 15ª, and that therefore what are usually the air up-takes of the furnace become waste gas down-takes and only function to permit the products of combustion to pass from the furnace.

Referring now to Figure 2, there is illustrated in a diagrammatic way a furnace similar to that shown in Figure 1, except that the gas system is omitted and there is only one checker chamber at each end of the furnace, such chambers serving as regenerators for the air. With such a construction the partition walls 1ᵇ do not extend thru the regenerators but stop at the terminus of the slag pockets, known as the gas and air slag pockets. The wall partition 4ᵇ being used to divert the air, which would ordinarily pass up thru the air intakes, to and thru what are known as the gas up-takes. The dampers 15 and 15ª control the egress of the products of combustion, or waste gases, thru the waste gas down-takes at the opposite ends of the furnace during each reversal of the furnace.

In Figures 1 and 2 which show in a diagrammatic way the furnace, the arrows indicate at the left hand end of the furnace the incoming air, the direction of the fuel and air, and the direction of the waste gases at the right hand end of the furnace, or exhaust end thereof.

In Figure 4 which is a cross-section of the exhaust end of the furnace the arrows show how the waste gases pass down thru both the air up-take (formerly the gas uptake) and the waste gas downtakes (formerly the air up-takes) and out thru the air and gas slag pockets and into the regenerator, the damper being opened to permit communication between the air and gas slag pockets and the regenerator.

In Figure 5 the full line arrows show the path of travel of the air at the incoming end of the furnace, and the dotted line arrows show the path of travel of the waste gases at the exhaust end of the furnace; the view being used for the purpose of illustrating by the use of the arrows both the incoming and exhaust ends of the furnace which is the case when the furnace is alternately reversed.

What we claim is:

1. In a regenerative furnace, in combination with the gas and air slag pockets, gas and air up-takes and fuel inlet ports, means providing communication in the division walls between gas and air slag pockets, means for closing the air slag pockets against ingress of air thereinto from the regenerators, means to conduct air from the regenerators to the gas slag pockets and up-takes leading therefrom, fuel burners arranged in said inlet ports and connected to a source of supply, and dampers for controlling the communicating means in the walls between said gas and air slag pockets.

2. In a regenerative furnace, in combination with the gas and air slag pockets, gas and air up-takes and fuel inlet ports, means providing communication in the division walls between said gas and air slag pockets, partition walls closing communication between the air slag pockets and the regenerators, means to conduct air from the regenerators to the gas slag pockets and up-takes leading therefrom, fuel burners arranged in said inlet ports and connected to a source of supply, means to close the communicating means in the division walls between said gas and air slag pockets when admitting fuel at either end of said furnace and to open said communicating means when the products of combustion are escaping at either end of said furnace.

3. In a regenerative furnace, in combination with a pair of slag pockets at either end of the furnace separated by division walls and with air systems, an air up-take at each end of the furnace connected with one slag pocket, a combined fuel and air inlet port in communication with each up-take, burners arranged in said inlet ports and connected to a source of fuel supply, exhaust downtakes at each end of the furnace connected with the other of said slag pockets, and means to open communication in the division walls between said slag pockets at either end of the furnace for the passage of waste gases therethru.

4. In a regenerative furnace, in combination with the air system, an air receiving regenerator at each end of the furnace arranged for communication with said system, a pair of slag pockets at each end of the furnace separated by division walls and only one of each pair arranged to receive air from said regenerators, an air up-take in communication with the air receiving slag pocket, a combined fuel and air inlet port in communication with each up-take, burners arranged in said inlet ports and connected to a source of fuel supply, exhaust downtakes at each end of the furnace connected with the other of said slag pockets, a communicating opening in the division walls between said slag pockets, and means to open and close said openings alternately as the furnace is reversed.

5. In a regenerative furnace, in combination with an air system, a pair of slag pockets at each end of the furnace, division walls separating said slag pockets each provided with openings therethru forming means of communication between said slag pockets, means to divert the ingress of air from said system into one only of each pair of slag pockets, an air up-take in communication with each air intake slag pocket, exhaust downtakes in communication with the other of said slag pockets, combined fuel and air intake ports connecting said air up-takes, concentrated fuel burners arranged in said inlet ports and connected with a source of supply, and dampers slidably arranged in the division walls between said slag pockets for controlling said communicating openings therein.

6. In a regenerative furnace, in combination, a pair of slag pockets, a division wall therebetween having an opening therein, means controlling the ingress of air into the furnace thru one slag pocket and the egress of the products of combustion thru the other slag pocket, and a damper controlling the opening in said division walls, said damper closing said opening on the ingress of air and removed from said opening on the egress of the products of combustion.

CHESTER A. KELLOGG.
JULIAN L. SCHUELER.